United States Patent [19]

Jahn

[11] 4,397,199

[45] Aug. 9, 1983

[54] GEAR RACK FOR A MINING MACHINE

[75] Inventor: Dieter Jahn, Bochum, Fed. Rep. of Germany

[73] Assignee: Gebr. Eickhoff, Maschinenfabrik und Eisengiesserei, m.b.H., Bochum, Fed. Rep. of Germany

[21] Appl. No.: 217,540

[22] Filed: Dec. 17, 1980

[51] Int. Cl.³ .............................................. F16H 1/04
[52] U.S. Cl. .................................. 74/422; 105/29 R; 104/165
[58] Field of Search .................. 105/29 R, 29 TL; 104/165; 74/422, 424.6, 89.17, 109; 299/43, 42

[56] References Cited

U.S. PATENT DOCUMENTS

| | | | |
|---|---|---|---|
| 329,104 | 10/1885 | Van Depoele | 105/29 R |
| 331,851 | 12/1885 | Van Depoele | 105/29 R |
| 1,140,412 | 5/1915 | Spelling | 105/29 R |
| 4,025,120 | 5/1977 | Balinov | 105/29 R |
| 4,082,361 | 4/1978 | Lanfermann | 105/29 R |
| 4,155,600 | 5/1979 | Lanfermann | 299/43 |
| 4,184,715 | 1/1980 | Lanfermann | 105/29 R |
| 4,186,970 | 2/1980 | Minke | 105/29 R |

FOREIGN PATENT DOCUMENTS

| | | | |
|---|---|---|---|
| 259781 | 6/1912 | Fed. Rep. of Germany | 105/29 R |
| 820663 | 11/1937 | France | 105/29 R |

Primary Examiner—Kenneth Dorner
Assistant Examiner—D. Wright
Attorney, Agent, or Firm—Thomas H. Murray; Clifford A. Poff

[57] ABSTRACT

Rack segments are formed with teeth to mesh with drive gears of a mining machine to propel it along a conveyor. The drive gears are spaced apart and mounted on a drive shaft with a sleeve member therebetween to engage the top surface of a rack segment. The rack segment has a rectangular body with arch-shaped upper and lower surfaces. Opposite end portions have a vertical hole to receive a support member which is anchored in place by a pin passed through an opening transversely thereto and arranged along a horizontal plane of symmetry. Attachments forming gear teeth project at uniformly-spaced intervals from opposite lateral sides of the rack body. The attachments have involute-like flanks extending upwardly and downwardly from the horizontal plane of symmetry such that a worn rack segment can be continually used by inverting its position 180°.

3 Claims, 1 Drawing Figure

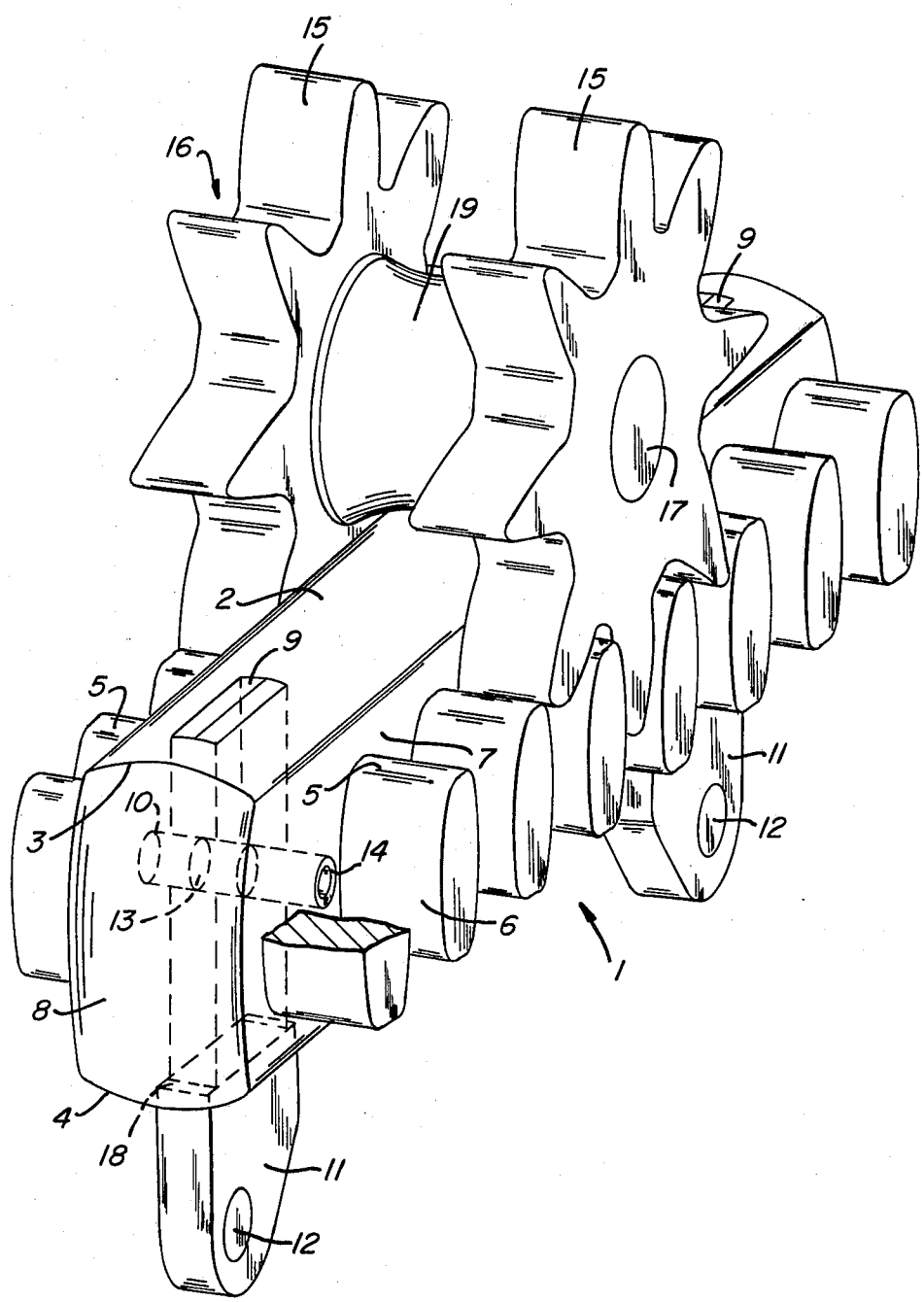

GEAR RACK FOR A MINING MACHINE

BACKGROUND OF THE INVENTION

This invention relates to a gear rack for propelling a mining machine used for underground mining wherein the gear rack includes a plurality of rack segments each having a hole in each of the opposite ends. The holes in adjacent ends of rack segments engage a support member and receive a fastener to form a flexible connection to allow limited motion lengthwise of the rack segments while rack teeth on both sides of the rack segments mesh with spur gears of a winch drive on the mining machine.

In West German patent publication No. 26 27 684, there is described a feeding mechanism for a mining machine constructed in the form of a gear rack and made up of rack segments. Tube-shaped portions of the gear racks are joined in a flexible manner such that adjacent ends of the rack segments are placed on the same support and contain a hole at the lower surface of each end for engagement with a support. The support engages from below the rack segment which can move lengthwise to a limited degree within a guide rail bounded by supports on the side. A bolt is used to connect end portions of the gear racks with a support to facilitate the formation of flexible joints and provide limited lengthwise motion. The mining machine which moves along a conveyor meshes with equally-spaced attachments on both sides of the gear rack segments. The attachments comprise a rotatable bolt in a hole located within a horizontal plane of the gear rack and perpendicular to the directin of motion by the mining machine. Protruding ends of the rack segments extend from the tube-shaped gear rack profile. The bolts for each rack segment are fixed in an axial direction by a device which is common to all the bolts. A portion of each bolt is designed to permit engagement with the device which substantially fixes the protruding portions of the bolts from the tube-shaped portions of the rack. Both ends of the rack segments have the shape of a sphere.

Gear racks suffer great wear because of the operating conditions existing in underground mining operations and because of the great stress imposed on the mining machine. Wear of the rack occurs mainly at such locations where the teeth of the driving gear wheel make contact with the teeth of the gear rack. These locations comprise the contacting surfaces between the driving pins and the flank segments of the gear teeth. Because of the connection with the rack support parts, the gear racks known in the art do not permit turning the rack segments 180° for continued use of a single gear rack segment such that the lower halves of the driving pins can be utilized for meshing engagement with the teeth of the driving wheel of the mining machine.

SUMMARY OF THE INVENTION

It is an object of the present invention to provide an arrangement and construction of parts to form rack segments such that each segment can be used in either of two positions to form a rack for a mining machine by inverting a rack segment 180°.

According to the present invention, there is provided in combination with a mining machine adapted to move along a conveyor, a rack comprising a plurality of rack segments supported end-to-end for limited lengthwise movement along the conveyor, the mining machine including a drive means having spaced-apart drive wheels for meshing with gear teeth on opposite sides of the rack segments each of which comprises an elongated rack body having a rectangular cross section with arch-shaped upper and lower surfaces along the length thereof, opposite end portions of the rack body having a vertical hole along the height thereof intersecting a horizontal hole extending across the width of the rack body within a horizontal plane of symmetry, and attachments projecting at uniformly-spaced intervals from opposite lateral sides of the rack body and rigidly attached thereto symmetrically with respect to the horizontal plane of symmetry, each attachment having involute-like flanks extending upwardly and downwardly from the horizontal plane of symmetry for driving engagement with the drive wheels of the mining machine.

A gear rack constructed in this manner can be continually used after subjected to severe wear along its entire length by rotating it 180° so that the previously-oriented lower rack surfaces now form the upper rack surfaces. Moreover, a single rack gear segment which is severely worn can be rotated 180° independently of adjacent rack segments for continued use.

According to a further characteristic of the present invention, the gear rack also serves as a support for the driving wheel of the mining machine where spur gears are arranged to mesh with the gear rack at laterally-spaced locations. The driving wheel is provided with a trough-shaped construction for support on the top surface of the gear rack body. The drive gear not only transfers a portion of the weight of the mining machine to the gear rack and guides the mining machine during traversing motion along the conveyor but also reliably meshes with the teeth of the gear rack.

It is advantageous to provide a box or sleeve between two spur gears on the shaft to form a drive arrangement which will permit rotary motion and avoid gliding motion between the gear rack body and the shaft of the driving wheels. The sleeve or box is constructed to provide a surface for mating engagement with the trough-shape of the gear rack body. Differences to the circular velocities cannot be avoided in cases where the diametric differences exist between the shaft and the spur gear motion. Such differences lead to a gliding motion with a slower velocity of the shaft.

These features and advantages of the present invention as well as others will be more fully understood when the following description of the preferred embodiment of the present invention is read in light of the accompanying single figure drawing which illustrates a perspective view of a rack segment and drive gear of a mining machine.

Before describing the details of the construction of the gear rack according to the present invention, it is well known in the art as shown, for example, in U.S. Pat. Nos. 4,082,361 and 4,155,600, to provide a gear rack made up of a plurality of rack segments arranged end-to-end for propelling a mining machine along a mine face. The rack is usually mounted at the side wall of a face conveyor or spillplate for both supporting and moving a mining machine, particularly a drum-cutter type mining machine along the conveyor. A drive on the mining machine usually referred to as a winch has a drive output shaft onto which gears, as will be described hereinafter, are mounted for propelling the mining machine along the rack through meshing engagement with the rack gear teeth. The drive gears of the mining machine engage rack teeth of the successively-arranged rack segments during traversing movement along the conveyor in either direction.

In the drawing, there is illustrated a rack segment 1 which constitutes one of a plurality of rack segments arranged end-to-end along a conveyor. The rack segment includes a rack body 2 with an approximate rectangular cross section and formed with arch-shaped or trough-like upper and lower surfaces 3 and 4, respectively, that define the gear rack body with upper and lower crowns. Attachments 5 are arranged at both sides of the gear rack body symmetrically with a horizontal plane of symmetry. The attachments are rigidly connected with the gear rack body 2. Each attachment is constructed to form a drive pin having involute-like flanks 6. This arrangement of parts provides teeth of a gear rack for involute meshing engagement with a drive gear. The involute profile of the teeth extends symmetrically from the horizontal plane of symmetry upwardly and downwardly. It will be observed that the attachments 5 extend in a vertical direction only partially over both sides of the gear rack body 2.

A rectangular hole 9 is located in end portions of the gear rack body 2 near cap-shaped ends 8 of the gear rack body. The rectangular hole extends over the entire height of the gear rack body. A hole 10 is located perpendicular to hole 9 within the horizontal plane of symmetry and between two attachments 5. A sprocket support 11 has a bored hole 12 and is placed in hole 9 of the gear rack body. The support 11 is tied by the hole 12 in the lower end thereof to, for example, the side bracket of a conveyor. The support 11 has a bored hole 13 at a height for alignment with hole 10 in the gear rack body and into which a pin member 14 is pressed. The support has two ledges 18 below the gear rack body 2 that limit the depth of penetration by the support in the gear rack body. The ledges 18 transfer the weight imposed on the rack by the mining machine to the conveyor through means of a bolt that is passed through hole 12.

A drive for the mining machine includes a drive wheel assembly 16 coupled to the winch drive of the mining machine. The drive wheel assembly includes two spur gears 15 which are connected by shaft 17. A box or sleeve 19 has a concave face surface arranged between the spur gears 15 for rotary motion on shaft 17. The drive wheel assembly is supported between the spur gears 15 on the trough-shaped surface 3 of the gear rack via sleeve 19. This arrangement of parts provides a rail for guiding the mining machine during traversing movement along the conveyor.

It is to be understood, however, that the mining machine may be equipped with a drive wheel 16 which has only one spur gear 15. In this case, the lifetime of the gear rack portions 1 for a gear rack is significantly increased because they can be continually used after worn portions are inverted by rotating a rack segment 180° and reattachment to the supports.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In combination with a mining machine adapted to move along a conveyor, a rack comprising a plurality of rack segments supported end-to-end for limited lengthwise movement along the conveyor, said mining machine including a drive means having spaced-apart spur gear drive wheels for meshing with gear teeth on opposite sides of said rack segments each of which comprises an elongated rack body having a rectangular cross section with arch-shaped upper and lower surfaces along the length thereof, opposite end portions of said rack body having a vertical hole along the height thereof intersecting a horizontal hole extending across the width of the rack body within a horizontal plane of symmetry thereof, and attachments projecting at uniformly-spaced intervals from opposite lateral sides of said rack body and rigidly attached thereto symmetrically with respect to said horizontal plane of symmetry, each attachment having involute toothed flanks extending upwardly and downwardly from said horizontal plane of symmetry such that inverting a rack segment 180° relocates downwardly-extending toothed flanks of the rack segment to extend upwardly for driving engagement with said spur gear drive wheels of said mining machine.

2. The combination according to claim 1 wherein the arch-shaped upper surface of said elongated rack body defines a support surface for said drive wheels, and wherein said drive means includes a trough-shaped surface between lateral sides of said drive wheels for engaging the support surface of the arch-shaped upper surface of said rack body.

3. The combination according to claim 2 wherein said trough-shaped surface is defined by a sleeve extending between said drive wheels, and wherein said drive means further includes a shaft drivingly interconnecting said drive wheels which support said sleeve therebetween.

* * * * *